United States Patent
Smith et al.

(10) Patent No.: US 8,963,923 B2
(45) Date of Patent: Feb. 24, 2015

(54) METHOD AND APPARATUS FOR ELECTRICAL POWER VISUALIZATION

(75) Inventors: Benjamin Smith, Petaluma, CA (US); Jonathon Wolfe, San Francisco, CA (US); Chris Eich, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 1290 days.

(21) Appl. No.: 12/381,301

(22) Filed: Mar. 10, 2009

(65) Prior Publication Data

US 2009/0231342 A1 Sep. 17, 2009

Related U.S. Application Data

(60) Provisional application No. 61/068,921, filed on Mar. 11, 2008.

(51) Int. Cl.
G09G 5/22 (2006.01)
G06T 11/00 (2006.01)

(52) U.S. Cl.
CPC .................................. G06T 11/001 (2013.01)
USPC ........................ 345/440.2; 345/589

(58) Field of Classification Search
None
See application file for complete search history.

(56) References Cited

U.S. PATENT DOCUMENTS

| | | | |
|---|---|---|---|
| 5,648,910 A * | 7/1997 | Ito | 716/104 |
| 6,115,493 A | 9/2000 | Harrington | |
| 6,587,108 B1 * | 7/2003 | Guerlain et al. | 345/440 |
| 2005/0240540 A1 * | 10/2005 | Borleske et al. | 705/401 |
| 2007/0141544 A1 * | 6/2007 | Nakane | 434/353 |
| 2007/0176933 A1 | 8/2007 | Culpi et al. | |
| 2007/0233442 A1 * | 10/2007 | Ito et al. | 703/13 |
| 2007/0271006 A1 | 11/2007 | Golden et al. | |
| 2008/0030403 A1 | 2/2008 | Honda et al. | |
| 2008/0192056 A1 | 8/2008 | Robertson et al. | |
| 2008/0300847 A1 * | 12/2008 | McConaghy et al. | 703/14 |
| 2009/0210178 A1 * | 8/2009 | Bieganski | 702/62 |
| 2009/0252163 A1 * | 10/2009 | Biswas | 370/390 |
| 2010/0043869 A1 | 2/2010 | Bennett et al. | |
| 2010/0114387 A1 * | 5/2010 | Chassin | 700/286 |

OTHER PUBLICATIONS

Klump et al., "Real-Time Data Retrieval and New Visualization Techniques for the Energy Industry", 2002, pp. 1-3, (http://citeseerx.ist.psu.edu/viewdoc/download?doi=10.1.1.105.7720&rep=repl&type=pdf).*

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.

"Task-Based Color Scale Design", Rheingans P., Proceedings of the International Society for Optical Engineering (SPIE), SPIE, USA LNKD-DO1:10.1117/12.384882, vol. 3905, Oct. 13, 1999, pp. 35-43, XP001033481 ISSN: 0277-786X.

(Continued)

*Primary Examiner* — David H Chu
(74) *Attorney, Agent, or Firm* — Moser Taboada

(57) ABSTRACT

A method and apparatus for providing a visualization of power for display. The method establishes a power visualization scale based on a color saturation and intensity range for a hue and a range of power to be visualized, and generates a display image for at least one measured value of power as a level of color saturation and intensity for the hue based on the power visualization scale.

20 Claims, 6 Drawing Sheets

(56) References Cited

OTHER PUBLICATIONS

"Computer Generation of Harmonic Equihue Color Scales" Melinda Földvári, The Visual Computer, vol. 11, No. 4, 1995. Sep. 2000, pp. 218-226.

"Perceptual Principles for Effective Visualizations", Penny Rheingans, et al., Mar. 1, 1995, Perceptual Issues in Visualization, Springer Verlag, DE, pp. 59-74, XP002515604, ISBN: 978-0-387-58096-8.

European Communication including the European Search Report and Annex to the European Search Report for European Application No. 09003475.2-2218/2104073.

Non-Final Office Action dated Nov. 7, 2012 for U.S. Appl. No. 13/618,288, entitled "Method and Apparatus for Electrical Power Visualization", 11 pages.

* cited by examiner

METHOD AND APPARATUS FOR ELECTRICAL POWER VISUALIZATION

CROSS-REFERENCE TO RELATED APPLICATIONS

This application claims benefit of U.S. provisional patent application Ser. No. 61/068,921, filed Mar. 11, 2008, which is herein incorporated in its entirety by reference.

BACKGROUND OF THE INVENTION

1. Field of the Invention

Embodiments of the present disclosure relate generally to a method and apparatus for visualization of electrical power data.

2. Description of the Related Art

Use of distributed generators (DGs) to produce energy from renewable resources is steadily gaining commercial acceptance due to the rapid depletion of existing fossil fuels and the increasing costs of current methods of generating power. One such type of distributed generator is a solar power system. Solar panels within the solar power system are comprised of photovoltaic (PV) modules that convert solar power received into a direct current (DC). An inverter then converts the DC current from the PV modules into an alternating current (AC). The power generated by the solar power system may then be used to run appliances at a home or business, or may be sold to the commercial power company.

Variations in energy produced by the PV modules in a solar power system may be attributed to various causes such as variations in the inverters, PV module mismatch (i.e., variations in power output within the manufacturer's tolerance), PV module or inverter damage, or different insolation profiles for the PV modules. In some cases, differences in insolation profiles may be due to a cause that cannot be altered or fixed, such as an immovable obstruction shading a PV module. In other cases, differences in insolation profiles may be due to correctable causes, such as dust or dirt on the surface of a PV module. However, current monitoring systems do not provide sufficient granularity to remotely gather and analyze operation information per solar panel. Thus, an operator may only know whether the overall system is operating properly.

Therefore, there is a need in the art for providing electrical power data related to a DG in a readily understandable format for performance analysis of the DG.

SUMMARY OF THE INVENTION

Embodiments of the present invention generally relate to a method and apparatus for providing a visualization of power for display. The method establishes a power visualization scale based on a color saturation and intensity range for a hue and a range of power to be visualized, and generates a display image for at least one measured value of power as a level of color saturation and intensity for the hue based on the power visualization scale.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
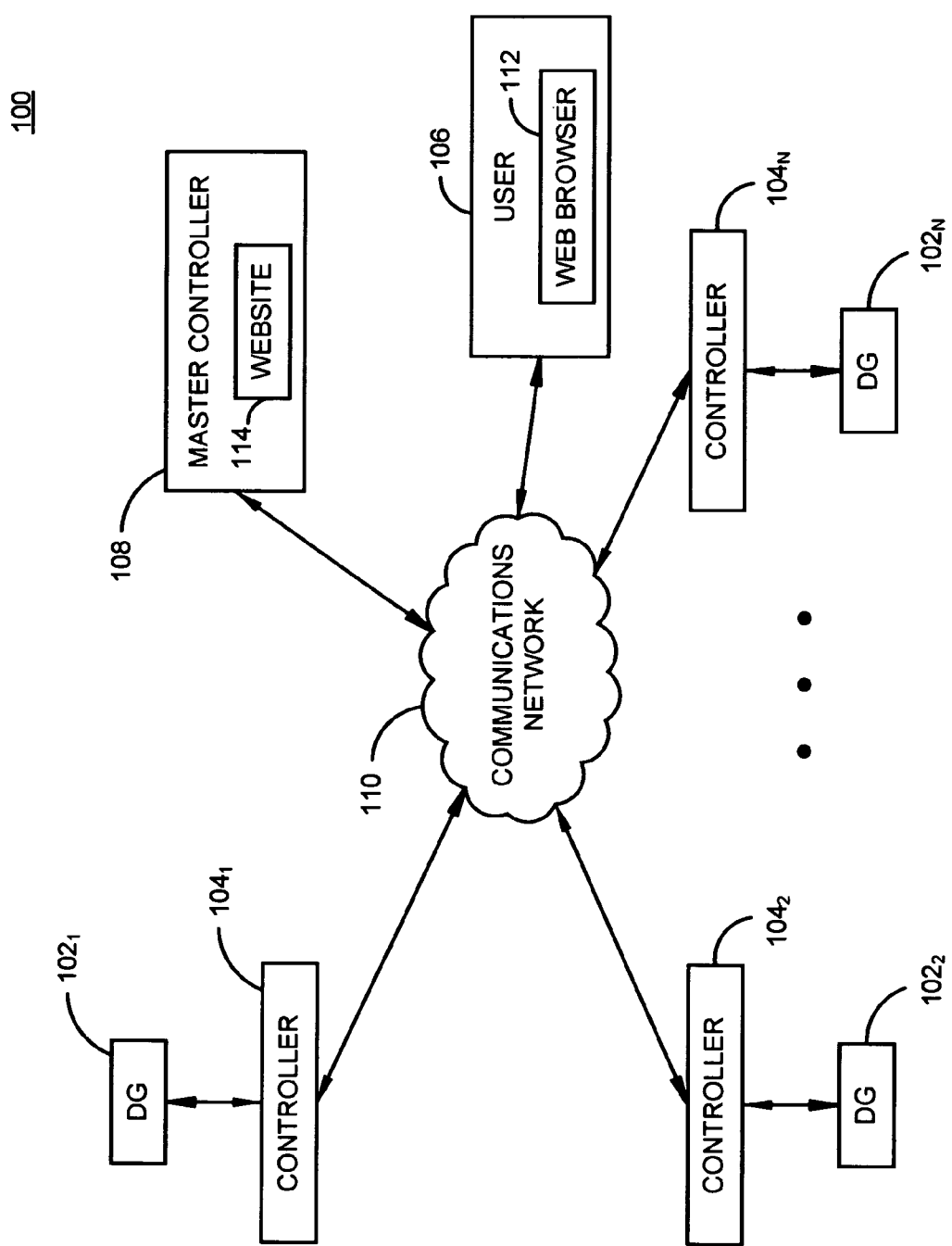
FIG. 1 is a block diagram of a system for providing electrical power visualization in accordance with one or more embodiments of the present invention.

FIG. 1 is a block diagram of a system 100 for providing electrical power visualization in accordance with one or more embodiments of the present invention. The system 100 comprises a plurality of distributed generators (DGs) $102_1$, $102_2$, ... $102_n$, (hereinafter, DGs 102), a plurality of controllers $104_1$, $104_2$, ..., $104_n$, (hereinafter, controllers 104), a user 106, a master controller 108, and a communications network 110. The controllers 104, the user 106, and the master controller 108 are communicably coupled via the communications network 110, e.g., the Internet.

The DGs 102 generate power from a renewable resource, such as solar energy, wind energy, hydroelectric energy, and the like. In some embodiments, a DG 102 is comprised of a plurality of solar panels arranged in groups as solar arrays, where each solar panel is comprised one or more inverters coupled to one or more PV modules in a one-to-one correspondence. Additionally, a DC-DC converter may be coupled between each PV module and each inverter (e.g., one converter per PV module). In one or more alternative embodiments, multiple PV modules may be coupled to a single inverter (i.e., a centralized inverter); in some such embodiments, a DC-DC converter may be coupled between the PV modules and the centralized inverter.

The PV module generates a direct current (DC) relative to the amount of solar energy it receives. The inverter converts the DC current generated by the PV module to an alternating current (AC). The generated AC current may be used to operate appliances in a home or business, coupled to a commercial power grid and sold to the commercial power utility, or a combination of both. In other embodiments, one or more of the DGs 102 may additionally or alternatively comprise a plurality of wind turbines, as in a "wind farm", for generating the DC current.

Each DG $102_1$, $102_2$, ..., $102_n$ is coupled to a controller $104_1$, $104_2$, ..., $104_n$, respectively, in a one-to-one correspondence. The controllers 104 collect data on the health and performance of the DGs 102, such as measurements of power generated by one of more components of the DG 102, power consumed from one of more components of the DG 102, and the like. Data may be collected at various levels of granularity; for example, for a DG 102 comprising a solar energy system, data may be collected for one or more individual PV modules, solar panels, and/or solar arrays, as well as for the entire solar energy system.

The collected data is communicated from the controllers 104 to the master controller 108. Additionally, the controllers 104 and/or the master controller 108 may communicate operational instructions to the DGs 102 for purposes of operating the DGs 102 and their components.

Figure 3:
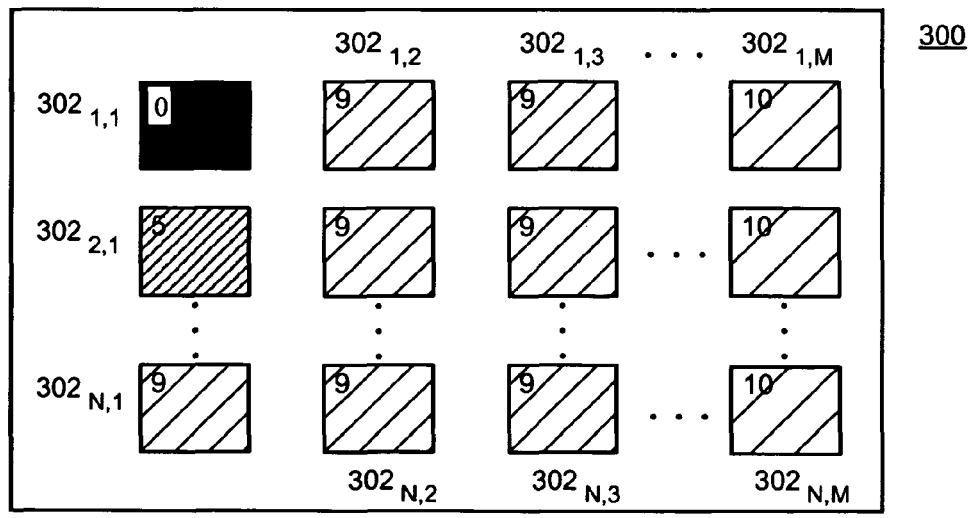
FIG. 3 is a representation of a display for electrical power visualization in accordance with one or more embodiments of the present invention.

Using a conventional web browser 112, the user 106 may access a website 114 supported by the master controller 108 (or a server having access to the master controller 108 data) to obtain a data display based on the collected data, where the data display represents the operation of the DG 102 in a readily understandable format as described in detail with respect to FIG. 3. Additionally, a multitude of users may access one or more of such displays representing the DG 102 operation via a password protected portal.

Figure 2:
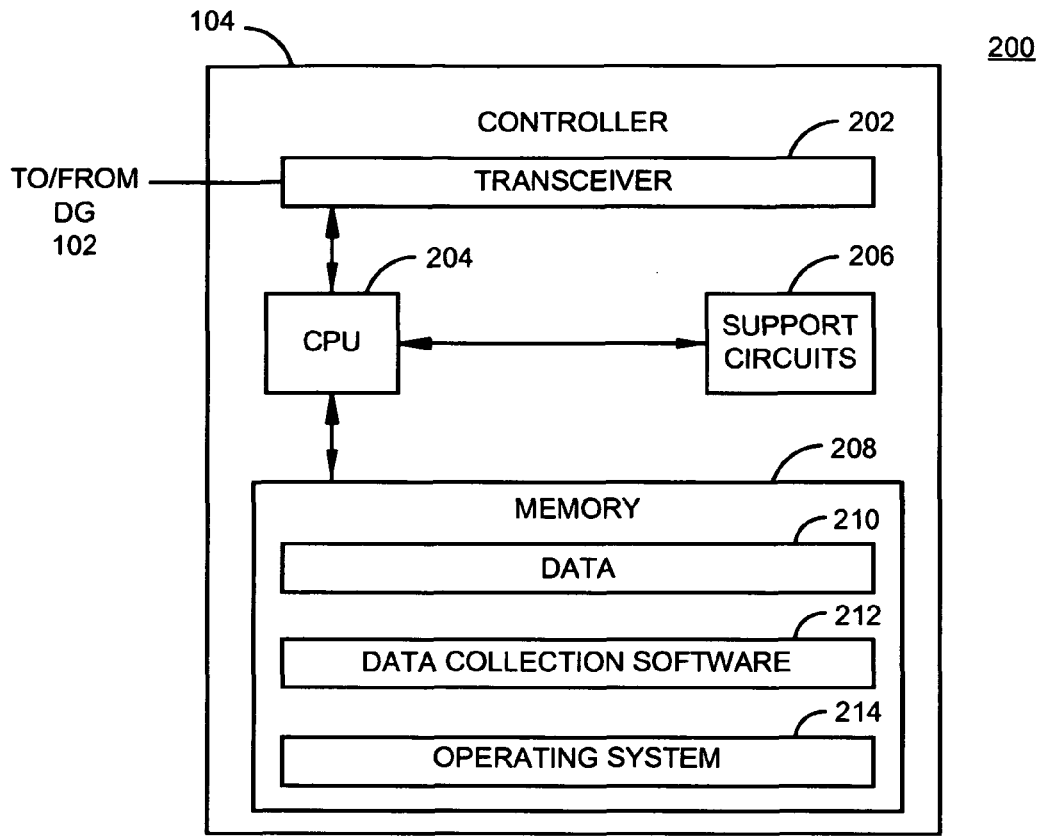
FIG. 2 is a block diagram of a controller in accordance with one or more embodiments of the present invention.

FIG. 2 is a block diagram of a controller 104 in accordance with one or more embodiments of the present invention. The controller 104 comprises a transceiver 202, at least one central processing unit (CPU) 204, support circuits 206, and a memory 208. The CPU 204 may comprise one or more conventionally available microprocessors. Alternatively, the CPU 204 may include one or more application specific integrated circuits (ASIC). The support circuits 206 are well known circuits used to promote functionality of the central processing unit. Such circuits include, but are not limited to, a cache, power supplies, clock circuits, buses, network cards, input/output (I/O) circuits, and the like.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores the operating system 214 of the controller 104. The operating system 214 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 208 may store various forms of application software, such as data collection software 212 for collecting operational data (e.g., measurements of electrical power data) from the subtending DG 102. In addition, the memory 208 may also store data 210 related to a subtending DG 102. Such data may be collected and stored at various levels of granularity; for example, for a DG 102 comprising a solar energy system, data may be collected and stored for one or more individual PV modules, solar panels, and/or solar arrays, as well as for the entire solar energy system The transceiver 202 couples the controller 104 to the DG 102 to facilitate command and control of the DG 102. Data 210 regarding operation of the DG 102, such as power generated by one or more components of the DG 102 and/or power consumed, is collected by the controller 104 via the transceiver 202. The transceiver 202 may utilize wireless or wired techniques for such communication.

The master controller 108 is a type of controller 104 that may contain additional elements, such as application software for managing a plurality of DGs 102, application software for managing the website 114, and/or application software pertaining to generating the data display representing the DG 102 operation.

FIG. 3 is a representation of a display 300 for electrical power visualization in accordance with one or more embodiments of the present invention. In one such embodiment, the DG 102 is comprised of a plurality of solar panels arranged in one or more solar arrays, where each solar panel is comprised of one or more of inverters coupled to one or more PV modules in a one-to-one correspondence. The PV modules generate DC power that is subsequently converted to AC power by the inverters, where the power at the output of the inverters is relative to the level of solar energy the PV modules receive. U.S. Patent Application Publication Number 2007/0221267 entitled "Method and Apparatus for Converting Direct Current to Alternating Current" and filed Sep. 27, 2007, which is herein incorporated in its entirety by reference, discloses an example of such inverter technology.

In one specific embodiment, the display 300 graphically comprises a plurality of display images $302_{1,1}$, $302_{1,2}$, ..., $302_{n,m}$, collectively known as display images 302, where each display image 302 represents one of the solar panels in the DG 102 in a one-for-one correspondence. The display images 302 are arranged in accordance with the physical layout of the solar panels comprising the DG 102; additionally and/or alternatively, a tabular representation of the display images 302 may be provided. For each solar panel of the DG 102, the corresponding display image 302 displays a visualization of associated electrical power data.

In order to produce a visualization of a type of electrical power associated with the solar panels of the DG 102, a power visualization scale is established. In one or more embodiments, the power visualization scale is based on a hue, saturation, and intensity (HSI) color description where a specific hue (e.g., blue) is assigned to represent a specific type of power to be visualized, such as an absolute power generated by the solar panels of the DG 102. In alternative embodiments, blue (or any other hue) may be assigned to represent a different type of electrical power from any one of a myriad of types of electrical power pertaining to one or more components of the DG 102, such as relative power generated by the solar panels or PV modules. In some embodiments, electrical power data related to consumption of power generated by the DG 102 may also be visualized. For example, power consumption for one or more branch circuits of the DG 102 may be tracked on a sub-hourly basis and scaled by a time-of-use (TOU) rate schedule prior to being visualized. A visualization of power consumption cost such as this may help users optimize their power consumption against the TOU rate schedule to achieve the greatest financial benefit.

In some embodiments, the power visualization scale establishes a level of color saturation and intensity for the selected hue as a function of the absolute power generated at the output of a solar panel of the DG 102. To achieve this, a linear scale of the absolute power generated by a solar panel is established, for example ranging from 0 to 100, where 0 represents a minimum power value, such as no power output, and 100 represents a maximum power value, such as an absolute maximum power output (i.e., the nominal power output rating of the solar panel). In some embodiments, a minimum and/or maximum power value of the electrical power data to be visualized may be obtained utilizing data collected from the DG 102. Additionally and/or alternatively, the minimum and/or maximum power value may be dynamically defined.

The power visualization scale is then established by mapping color saturation and intensity to the linear scale. A linear interpolation of color saturation of the selected hue from 100% to 50% saturation is mapped to the range of values from 50 to 100 on the linear scale and a color saturation of 100% is mapped to values from 0 to 50 on the linear scale. In conjunction with the saturation, a linear interpolation of intensity from 0% to 100% intensity is mapped to the range of values from 0 to 50 on the linear scale and an intensity level of 100% is mapped to values from 50 to 100 on the linear scale. By utilizing the resulting scaled color saturation and intensity levels, the absolute power generated by the solar panel of the DG 102 can be visualized by a color at a particular saturation and intensity, thereby creating a readily understandable display representing the operation of the DG 102.

In some embodiments, the power visualization scale is established by mapping a linear interpolation of red/green/blue (RGB) components of a particular color to the linear scale of absolute power. In such embodiments, three colors ($C_1$, $C_2$, and $C_3$) of the same hue are selected, where $C_1$ is generally low-intensity and high-saturation, $C_2$ is high in both intensity and saturation, and $C_3$ is high-intensity but less saturated than $C_2$. For example, $C_1$ may be black, $C_2$ may be blue, and $C_3$ may be bluish-white. A linear interpolation of $C_1$ and $C_2$ is mapped to the values from 0 to 50 on the linear scale of absolute power, and a linear interpolation of $C_2$ and $C_3$ are mapped to the values from 50 to 100. For example, colors $C_1$, $C_2$, and $C_3$ having RGB component values of (0, 0, 0), (0, 137, 237), and (162, 219, 255), respectively, would result in the following linear power scale/RGB component value mappings: 0=>(0, 0, 0); 25=>(0, 68, 118); 50=>(0, 137, 237); 80=>(97, 186, 248); and 100=>(162, 219, 255).

In some embodiments, $C_1$ may be selected as a color other than black, for example to reflect that a displayed value of "0" on the power visualization scale (i.e., a display of $C_1$) depicts a minimum-performance in terms of the corresponding type of electrical power rather than an absolute value of zero power.

Based on capabilities of the display 300, the values on the power visualization scale may be continuous (e.g., each distinct scaled value maps to a different color value) or quantized to obtain a small number (e.g., 128) of distinct values for display.

The absolute power generated by each solar panel of the DG 102 may be obtained by the master controller 108 on a periodic basis and mapped to the power visualization scale for display; in some embodiments, individualized power visualization scales may be utilized for one or more of the solar panels based on their characteristics. The corresponding levels of color saturation and intensity are displayed in each of the display images 302 of the display 300, providing a visualization of the absolute power generated by each solar panel of the DG 102. As illustrated in FIG. 3, different levels of color saturation and intensity are depicted by different densities of cross-hatching. Additionally, a numerical value of the absolute power generated by each solar panel of the DG 102 may be included in the corresponding display image 302, and/or a visual depiction of the power visualization scale may be included in the display 300, for example a display of the color saturation and intensity range from the minimum to the maximum power value.

The periodicity of obtaining the absolute power generated by each solar panel of the DG 102 can be varied as needed. For example, the absolute power data may be obtained on an hourly basis in order to observe variations in power generated per solar panel as the position of the sun changes throughout the day. In addition to or as an alternative to a live display, data such as this obtained over successive time periods may also be displayed at a later time using time-lapse animation. Viewing the absolute power generated by each solar panel of the DG 102 over an extended time period as a time-lapse animation can help identify external shading obstacles. As shadows of the external shading objects move from west to east during the day, the associated changes in the absolute power generated by the affected solar panels of the DG 102 are clearly depicted in the time-lapse animation.

In an alternative embodiment, power consumption data, such as absolute or relative power consumption, may be obtained periodically, for example sub-hourly, and mapped to a Time-of-Use (TOU) rate schedule in addition to being mapped to a power visualization scale for display. A visualization of power consumption in this manner may help users optimize their power consumption against the TOU rate schedule.

Figure 4:
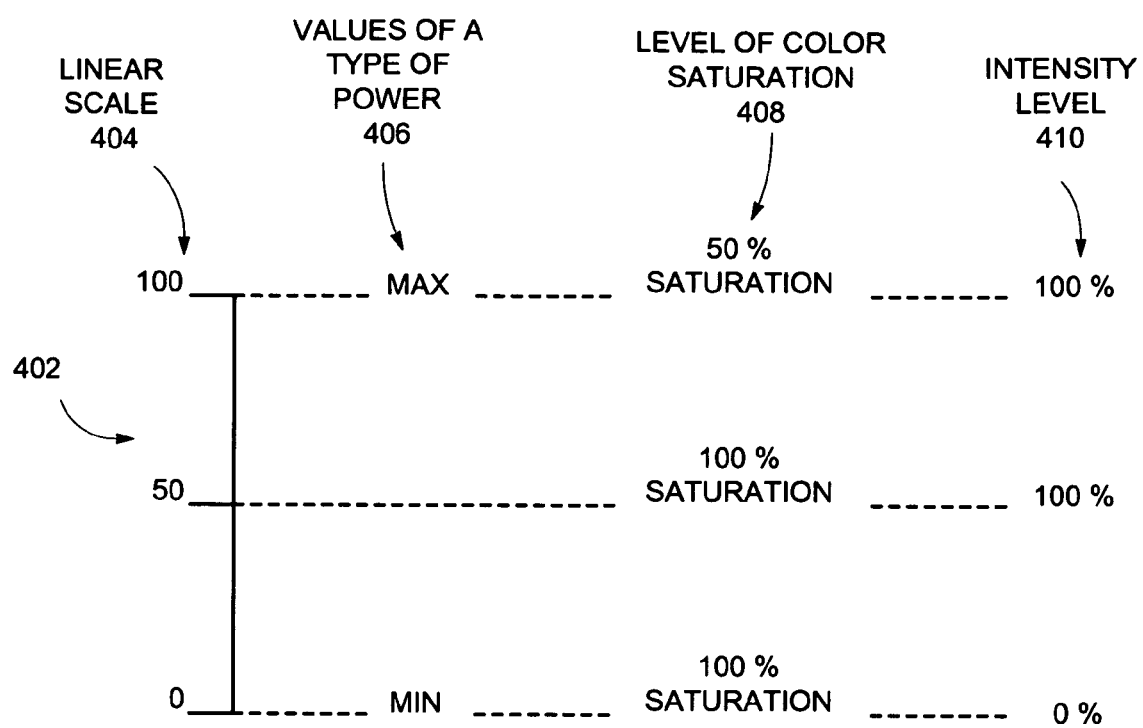
FIG. 4 is a representation of a power visualization scale in accordance with one or more embodiments of the present invention.

FIG. 4 is a representation of a power visualization scale 402 in accordance with one or more embodiments of the present invention. Values of a type of power 406 for a component of a DG (e.g., values of absolute power generated by a solar panel of the DG) are mapped to a linear scale 404. In some embodiments, values of absolute power generated by a solar panel ranging from a minimum (e.g., 0) to a maximum (e.g., a manufacturer's nominal power output rating for the solar panel) are linearly mapped to a linear scale 404 ranging from 0 to 100, where the minimum and maximum values of absolute power generated correspond to values of 0 and 100, respectively.

A level of color saturation 408 for a particular hue ranging from 50% to 100% is linearly mapped to values from 100 to 50 on the linear scale 404, where 50% color saturation corresponds to a value of 100 on the linear scale 404 and 100% color saturation corresponds to a value of 50 on the linear scale 404. Additionally, a color saturation of 100% for the hue is mapped to values from 50 to 0 on the linear scale 404.

An intensity level 410 ranging from 0% to 100% is linearly mapped to values from 0 to 50 on the linear scale 404, where 0% intensity corresponds to a value of 0 on the linear scale 404 and 100% intensity corresponds to a value of 50 on the linear scale 404. Additionally, an intensity level of 100% is mapped to values from 50 to 100 on the linear scale 404.

Figure 5:
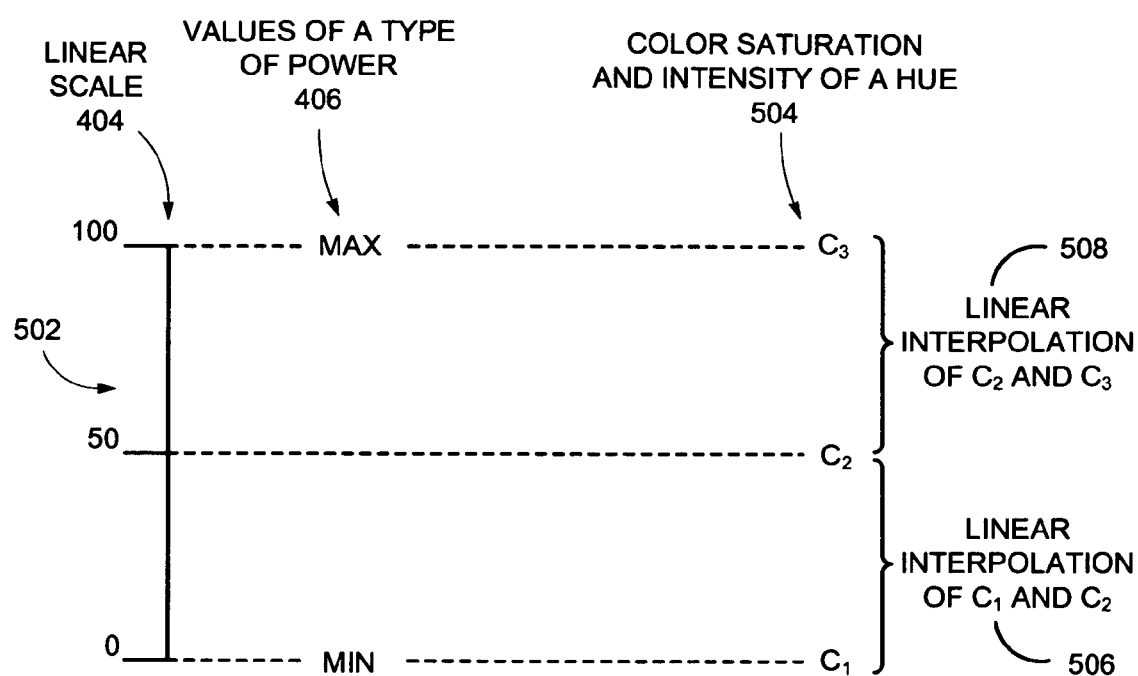
FIG. 5 is a representation of a power visualization scale in accordance with one or more embodiments of the present invention.

FIG. 5 is a representation of a power visualization scale 502 in accordance with one or more embodiments of the present invention. Values of a type of power 406 for a component of a DG are mapped to a linear scale 404, as previously described.

Colors $C_1$, $C_2$, and $C_3$, each comprising a different level of saturation and intensity of a particular hue 504, are mapped to values 0, 50, and 100, respectively, on the linear scale 404. In some embodiments, $C_1$ is a color having low-intensity and high-saturation, $C_2$ is high in both intensity and saturation, and $C_3$ is high-intensity but less saturated than $C_2$. A linear interpolation of $C_1$ and $C_2$ 506 (i.e., a linear interpretation of $C_1$ and $C_2$ red/green/blue (RGB) components) is mapped to linear scale values ranging from 0 to 50. A linear interpolation of $C_2$ and $C_3$ 508 (i.e., a linear interpretation of $C_2$ and $C_3$ red/green/blue (RGB) components) is mapped to linear scale values ranging from 50 to 100.

Figure 6:
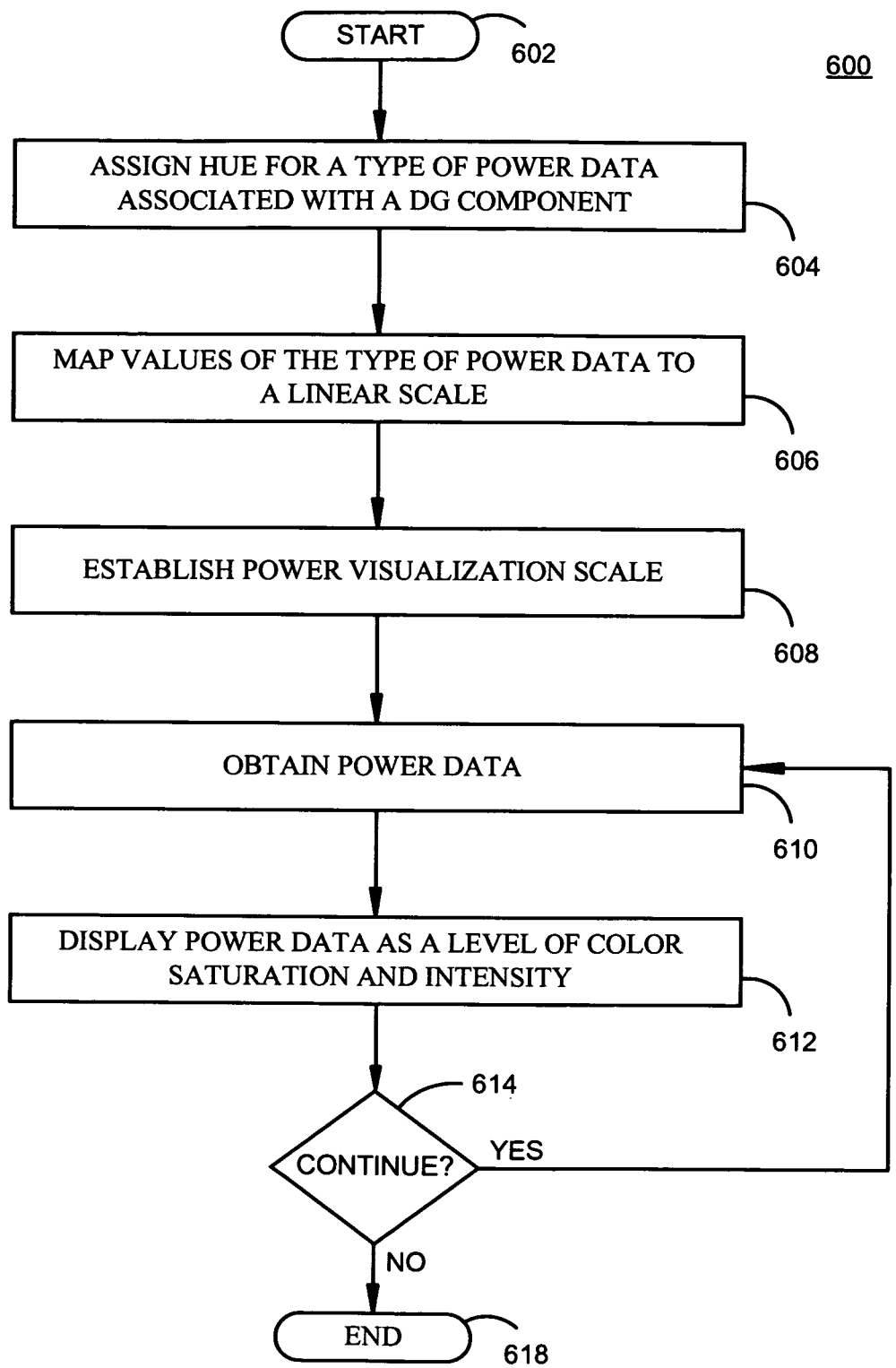
FIG. 6 is a flow diagram of a method for displaying a visualization of electrical power in accordance with one or more embodiments of the present invention.

FIG. 6 is a flow diagram of a method 600 for displaying a visualization of electrical power in accordance with one or more embodiments of the present invention. The method 600 begins at step 602 and proceeds to step 604, where a hue is assigned to represent a particular type of power associated with one or more components of a DG. For example, a particular hue such as blue may be assigned to represent absolute or relative power generated by one or more solar panels or PV modules of the DG, or absolute or relative power consumption.

At step 606, a linear scale is established, such as the linear scale 404, and values of the type of power ranging from a minimum value to a maximum value are mapped (e.g., linearly mapped) to the linear scale. For example, values of absolute power generated by a solar panel ranging from 0 to a maximum value (e.g., a nominal power output rating for the solar panel) may be linearly mapped to linear scale values from 0 to 100, respectively. Alternatively, values of relative power generated by a solar panel ranging from a minimum value to a maximum value may be linearly mapped to linear scale values from 0 to 100, respectively; in such an embodiment, the minimum and/or maximum values may be determined from analysis of actual data and in some cases may be dynamically determined. For example, a maximum value of relative power production may be dynamically defined as the harvest of the best-producing solar panel of the DG during a particular interval.

The method 600 then proceeds to step 608, where a power visualization scale is established. In some embodiments, as previously described, a level of color saturation ranging from 50% to 100% is linearly mapped to values from 100 to 50 on the linear scale, where 50% and 100% color saturation correspond to linear scale values of 100 and 50, respectively, and a color saturation of 100% is mapped to linear scale values from 50 to 0.

In conjunction with the color saturation, an intensity level is mapped to the linear scale such that intensity levels ranging from 0% to 100% correspond to linear scare values from 0 to 50, respectively, and an intensity level of 100% corresponds to linear scale values from 50 to 100. In some embodiments, as previously described, the power visualization scale is established by mapping a linear interpolation of red/green/blue (RGB) components of a particular color to the linear scale. The established power visualization scale provides a means for generating color saturation and intensity levels for a particular hue relative to the level of the type of power to be visualized.

The method 600 proceeds to step 612. At step 612, power data to be visualized, for example measurements of absolute power generated by each solar panel of the DG, is obtained. In some embodiments, such power data may be periodically obtained by a master controller communicably coupled to the DG. At step 614, the power visualization scale is utilized to determine values of color saturation and intensity corresponding to the obtained power data and generate a display visualizing the obtained power data, such as the display 300. Additionally and/or alternatively, the resulting color saturation and intensity values may be applied to a tabular representation of the obtained power data presented to the user.

The visualization of the obtained power data may be displayed in real time; in some embodiments, the visualization of power data over a period of time may be displayed in a time-lapse animation. Additionally and/or alternatively, the obtained power data may be scaled by a TOU rate prior to being displayed.

The method 600 proceeds to step 614, where a determination is made whether to continue. If the result of such determination is yes, the method 600 returns to step 610 to obtain additional power data for display. In some embodiments, the minimum and/or maximum power values utilized to generate the power visualization scale may be dynamically defined, requiring the range of power values from the minimum to the maximum to be re-mapped on the power visualization scale.

If the result of the determination at step 614 is no, the method 600 proceeds to step 618 where it ends.

Figure 7:
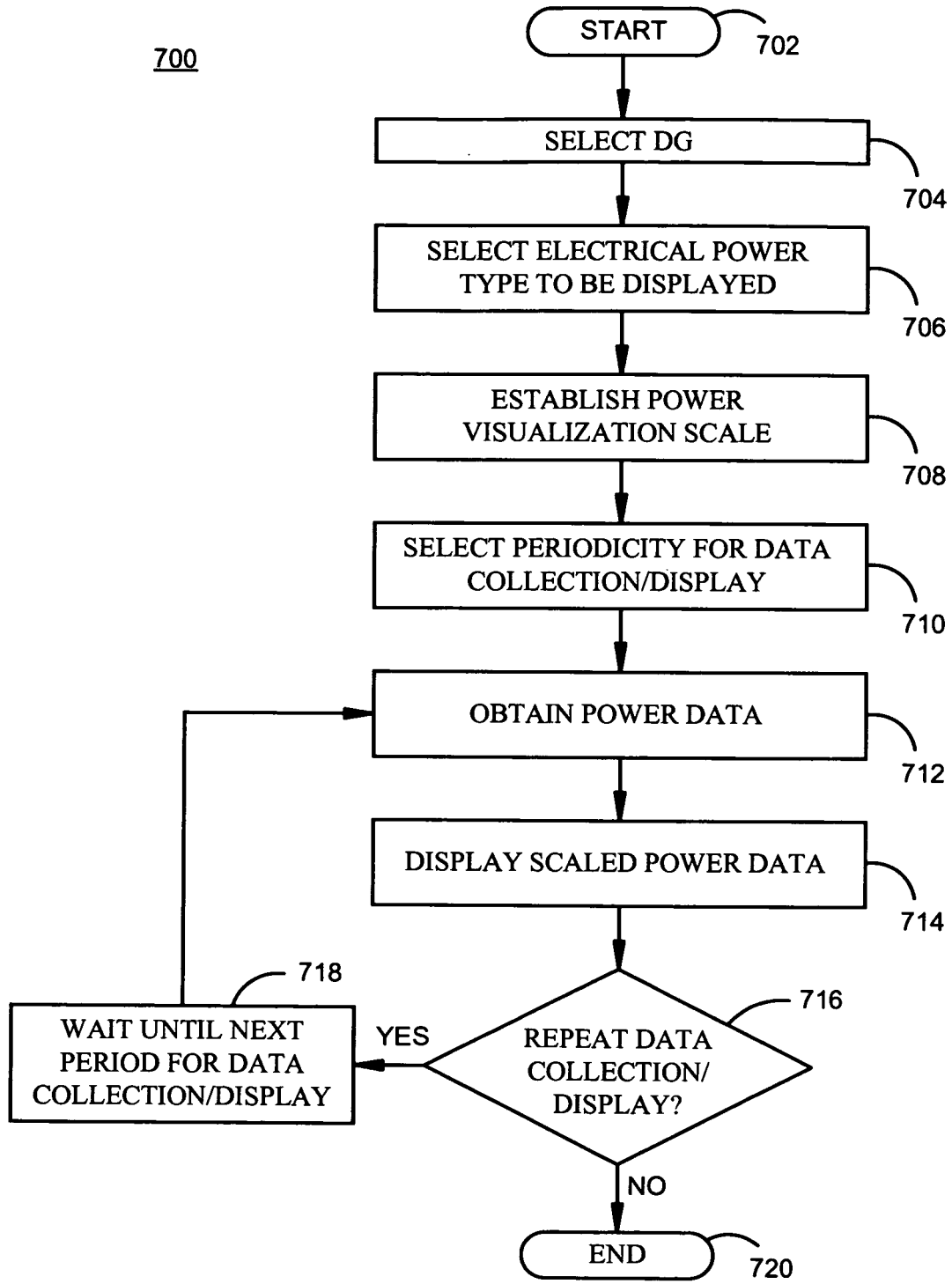
FIG. 7 is a flow diagram of a method for displaying a visualization of electrical power production in accordance with one or more embodiments of the present invention.

FIG. 7 is a flow diagram of a method 700 for displaying a visualization of electrical power in accordance with one or more embodiments of the present invention. In some embodiments, such as the embodiment described below, one or more DGs are each coupled to a controller in a one-to-one correspondence. A master controller is communicably coupled to the DGs via their respective controllers for facilitating command and control of the DGs and the visualization of corresponding electrical power.

The method 700 begins at step 702 and proceeds to step 704. A user logs into (e.g., enters a user name and password) a website supported by the master controller, either locally or via a communications network, and selects one or more DGs of interest. In one embodiment, each DG is comprised of a plurality of solar panels arranged in groups of solar arrays, each solar panel being comprised of one or more inverters coupled to one or more PV modules in a one-to-one correspondence. At step 706, the user selects a type of electrical power and a granularity level that they would like displayed, for example an absolute power generated by each solar panel of the selected DGs. In alternative embodiments, the electrical power to be displayed may be a relative power generated, an absolute power consumed, a relative power consumed, or a similar type of electrical power. Additionally, the granularity level of data to be displayed may correspond to one or more individual components, a group of components, or a set of groups of components of one or more DGs.

The method 700 proceeds to step 708. A power visualization scale is established as previously described, where color saturation and intensity values for a particular hue are established as a function of the desired electrical power to be displayed (i.e., absolute power generated by the solar panels of the DGs). The hue to be employed in the display may be pre-set or selected by the user as part of the method 700. Additional data to establish the power visualization scale, such as a nominal power output rating of the solar panel or actual power output from one or more solar panels, may be obtained from the controllers, the master controller, and/or an alternative source. In some embodiments, the power visualization scale may be dynamically defined; for example, a maximum power generated by a solar panel may be dynamically defined as the harvest from the best-performing solar panel in the DGs over a particular interval.

At step 710, the user selects a periodicity for the desired power data to be obtained and displayed. In alternative embodiments, the periodicity may be pre-set. The method 700 then proceeds to step 712, where the controllers coupled to the selected DGs obtain the desired power data. At step 714, the obtained electrical power data is mapped to the power visualization scale. The resulting levels of color saturation and intensity are displayed as display images, such as display images 302, providing a visualization of the desired power data. Such display images may be displayed as a two-dimensional grid corresponding to the layout of the selected DGs and/or as a tabular representation. In some embodiments, the obtained electrical power data may be further scaled by a TOU rate prior to being displayed.

The method 700 proceeds to step 716, where a determination is made whether to continue collecting the desired electrical power data for display. If the result of such determination is yes, the method 700 proceeds to step 718. At step 718, the method 700 waits the appropriate amount of time to begin the next cycle of electrical power data collection/display and then returns to step 712. In some embodiments, the minimum and/or maximum power values utilized to generate the power visualization scale may be dynamically defined, requiring the range of power values from the minimum to the maximum to be re-mapped on the power visualization scale. In alternative embodiments, the electrical power data collected over a period of time may be displayed in a time-lapse animation.

If, at step 716, the result of the determination is no, the method 700 proceeds to step 720 where it ends. In one or more embodiments, multiple users at one or more distinct locations may simultaneously perform the method 700 based on at least different types of power data, different granularities of power data, different hues, and/or different data displays (e.g., real-time display vs. time-lapse display). The users may remotely access the website to select their desired criteria, as described above, and remotely obtain the resulting displays of the desired power visualization.

While the foregoing is directed to embodiments of the present invention, other and further embodiments of the invention may be devised without departing from the basic scope thereof.

The invention claimed is:

1. A method for providing a visualization of power for display, comprising:
   establishing a power visualization scale based on a color saturation and intensity range for a hue and a range of power to be visualized; and
   generating a display image for at least one measured value of power as a level of color saturation and intensity for the hue based on the power visualization scale.

2. The method of claim 1, wherein the establishing a power visualization scale comprises:
   establishing a linear scale from a minimum value of the range of power to a maximum value of the range of power; and
   mapping the color saturation and intensity range to the linear scale.

3. The method of claim 2, wherein the mapping the color saturation and intensity range comprises (i) mapping a linear interpolation of a first color saturation and intensity for the hue and a second color saturation and intensity for the hue to a first range on the linear scale; and (ii) mapping a linear interpolation of the second color saturation and intensity for the hue and a third color saturation and intensity for the hue to a second range on the linear scale.

4. The method of claim 1, wherein the power is absolute power generated, relative power generated, absolute power consumed, or relative power consumed.

5. The method of claim 1, wherein the at least one measured value is scaled by a time of use (TOU) rate.

6. The method of claim 1, wherein the range of power is dynamically defined.

7. The method of claim 1, further comprising displaying the display image based on at least one of a physical layout of a distributed generator (DG) generating the at least one measured value or a tabular representation.

8. The method of claim 1, further comprising displaying the display image utilizing time-lapse animation.

9. The method of claim 1, wherein the display image comprises a numerical value corresponding to the at least one measured value.

10. The method of claim 1, further comprising providing a remotely accessible display of the display image.

11. Apparatus for providing a visualization of power for display, comprising:
    a master controller for generating a display image for at least one measured value of power as a level of color saturation and intensity for a hue based on a power visualization scale.

12. The apparatus of claim 11, wherein the master controller supports a remotely accessible display of the display image.

13. The apparatus of claim 12, wherein the display is based on at least one of a physical layout of a distributed generator (DG) generating the at least one measured value or a tabular representation.

14. The apparatus of claim 12, wherein the display utilizes time-lapse animation.

15. The apparatus of claim 11, wherein the display image comprises a numerical value corresponding to the at least one measured value.

16. The apparatus of claim 11, wherein the power visualization scale is generated by:
    establishing a linear scale from a minimum value of a range of power to be visualized to a maximum value of the range of power; and
    mapping a color saturation and intensity range for the hue to the linear scale.

17. The apparatus of claim 16, wherein the mapping a color saturation and intensity range comprises (i) mapping a linear interpolation of a first color saturation and intensity for the hue and a second color saturation and intensity for the hue to a first range on the linear scale; and (ii) mapping a linear interpolation of the second color saturation and intensity for the hue and a third color saturation and intensity for the hue to a second range on the linear scale.

18. The apparatus of claim 11, wherein the at least one measured value is scaled by a time of use (TOU) rate.

19. The apparatus of claim 16, wherein the range of power is dynamically defined.

20. A system for providing a visualization of power for display, comprising:
    at least one distributed generator (DG) for generating power; and
    a master controller, communicably coupled to the at least one DG, for generating a display image for at least one measured value of the power as a level of color saturation and intensity for a hue based on a power visualization scale.

* * * * *